United States Patent
Myers et al.

(10) Patent No.: US 6,699,019 B2
(45) Date of Patent: Mar. 2, 2004

(54) RECIPROCATING WINDMILL PUMPING SYSTEM

(76) Inventors: Steven Craig Myers, 1153 Country Rd. 422, Hondo, TX (US) 78861; Allan Curtis Hogue, 5805 Kevin, Texarkana, TX (US) 75503

( * ) Notice: Subject to any disclaimer, the term of this patent is extended or adjusted under 35 U.S.C. 154(b) by 0 days.

(21) Appl. No.: 10/297,970

(22) PCT Filed: Jun. 8, 2001

(86) PCT No.: PCT/US01/18504
§ 371 (c)(1),
(2), (4) Date: Jun. 12, 2000

(87) PCT Pub. No.: WO01/96708
PCT Pub. Date: Dec. 20, 2001

(65) Prior Publication Data
US 2003/0202889 A1 Oct. 30, 2003

Related U.S. Application Data
(60) Provisional application No. 60/210,829, filed on Jun. 12, 2000.

(51) Int. Cl.[7] ............ F04B 17/00; F04B 17/02; F04B 35/00
(52) U.S. Cl. ............ 417/334; 60/398; 166/372; 417/390
(58) Field of Search ............ 417/334, 335, 417/390, 53; 60/398, 325, 459; 166/370, 372, 369, 90.1, 68, 267, 68.5

(56) References Cited

U.S. PATENT DOCUMENTS

| 1,632,188 | A | | 6/1927 | Loeber | |
|---|---|---|---|---|---|
| 3,367,281 | A | * | 2/1968 | Gray | 103/234 |
| 4,174,926 | A | * | 11/1979 | Hamrick et al. | 417/334 |
| 4,358,250 | A | * | 11/1982 | Payne | 417/302 |
| 4,372,389 | A | | 2/1983 | Hamrick et al. | |
| 4,385,871 | A | | 5/1983 | Beisel | |
| 6,109,358 | A | * | 8/2000 | McPhee et al. | 166/401 |
| 6,155,047 | A | * | 12/2000 | Streetman | 60/398 |

* cited by examiner

Primary Examiner—Cheryl J. Tyler
Assistant Examiner—Han L Liu
(74) Attorney, Agent, or Firm—Cox & Smith Incorporated

(57) ABSTRACT

A system for pumping water from a well (32) drilled into an underground water source (44) that is operable in association with the windmill (10) having a tower frame (14), a wind driven turbine (12), and a reciprocating pump shaft (16) operably connected to the turbine. The system includes an air pump (20) mechanically linked to the reciprocating pump shaft (16) of the windmill (10) and operable by the direct reciprocating motion of the shaft (16). The air pump (20) operates through the reciprocating motion of the windmill shaft (16) and delivers a flow of compressed air into the well (32) down to a point below the water level within the well (32). An air lift fluid pump (20, 36) is positioned within the well (32) and comprises a submerged mixing chamber wherein compressed air is injected into the mixing chamber forming a buoyant air-water mixture. This buoyant mixture flows towards the surface which in turn draws water up through the fluid conduit (38) to the surface.

10 Claims, 4 Drawing Sheets

RECIPROCATING WINDMILL PUMPING SYSTEM

CROSS REFERENCE TO RELATED APPLICATIONS

The present application is entitled to the benefit of the filing of U.S. Provisional Application Serial No. 60/210,829 filed Jun. 12, 2000.

BACKGROUND OF THE INVENTION

1. Field of the Invention

The present invention relates generally to the recovery of water from an underground source through the use of a reciprocating pump system. The present invention relates more specifically to an improved water pumping system adapted to be driven by a windmill that utilizes an air lift fluid pump for generating a flow of water to the surface.

2. Description of the Related Art

Water pumping windmills may be found on farms and ranches worldwide and provide critical water supply for domestic and livestock use, especially in areas where electrical and fuel driven pumps are not practical. The type of technology associated with these windmill water pumps has enjoyed continuous use since the late $19^{th}$ Century and may be generally illustrated by U.S. Pat. No. 1,632,188 assigned to the Dempster Mill Manufacturing Company (1927). This type of windmill pumps water by means of a positive displacement, reciprocating pump, submerged below the static water level of a drilled well. The pump is conventionally connected and supported by a water discharge pipe which leads to the surface and a reservoir for the water. The pump is driven by a reciprocating rod, typically made of wood or fiberglass, which reaches down from the windmill's transmission to the pump through the discharge pipe.

It is typical in reciprocating water pumps of this type to utilize a barrel or cylinder within which a piston is moved in a reciprocating motion by the pump rod. Both the piston and the bottom of the pump barrel incorporate check valves that allow water to flow only in the upper direction. The check valve at the bottom of the cylinder is commonly called the foot valve, while the valve in the piston is commonly called the lift valve. When the piston is lifted by the pump rod attached to the surface windmill, the lift valve closes and the piston lifts the entire column of water above it until water overflows out of the discharge pipe at the surface. At the same time a slight suction is formed under the piston causing the foot valve to open and water to flow in under the piston. During the next half of the cycle the piston moves down causing the foot valve to close and the lift valve to open such that water flows through the piston into a position to be lifted during the next half cycle.

Water flow valves, such as those described above, must be periodically replaced. The lift valve, which is typically made of leather or rubber, eventually wears due to particles of sand or earth in the water. Other check valves involved with the system also have finite useful lives and must be replaced on a regular basis. Replacement typically involves the removal of the pump rod, discharge pipe and pump by lifting the entire assembly up from the drilled well in order to access the valves. Such replacement efforts involve considerable labor and expense and greatly affect the down time of the windmill pumping system.

Obviously many efforts have been made in the past to replace the windmill pumping system powered by electrical motors and internal combustion engines. The present concern relates only to such efforts that have sought to improve upon wind driven pumping systems. One effort in the past is described in U.S. Pat. No. 3,367,281 issued to Gray on Feb. 6, 1968 entitled APPARATUS FOR PUMPING WATER FROM WELLS USING WIND POWER. The Gray patent discloses a water pumping device in which compressed air is generated by a windmill, stored in a tank, controlled through a pressure regulator, and delivered to a displacement type water pump. This invention, although not overly complex, is not directly adaptable to the typical windmill structure. The Gray disclosure describes a down stroke of a windmill pump rod as the compression stroke which does not lend itself well to application in conjunction with typical windmills that are designed to apply force and power on the upstroke of the pump rod. The pump rod conventionally made of wood would likely snap if used to compress air on the down stroke. The Gray invention also utilizes solenoid valves that are electrically controlled to effectuate the air compression cycle. Such electrically controlled valves are typically not practical in remote windmill locations. Finally, the Gray invention further requires the use of an air hold-up means and a pressure regulator.

U.S. Pat. Nos. 4,385,871 and 4,358,250 provide further examples of inventions generally related to the conversion of wind energy into compressed air for the purpose of water pumping. These earlier efforts, however, also do not address an appropriate adaptation of the air compressing mechanism to the typical windmill structure or to the utilization of the same in conjunction with an air injection type water pump.

SUMMARY OF THE INVENTION

It is therefore an object of the present invention to provide a water pumping system that is driven by a reciprocating windmill pump rod that is inexpensive to produce, install, maintain and operate.

It is a further object of the present invention to provide a water pumping system that may be retrofit onto existing reciprocating windmill structures and thereby replace the reciprocating water pump system utilized thereon.

It is yet another object of the present invention to provide an air lift water pumping system that retrofits to existing windmill structures and eliminates the heretofore required maintenance efforts associated with windmill well pumps.

It is a further object of the present invention to provide an improved air lift water well pumping system that may be retrofit onto existing windmill structures and which utilizes the upstroke as the power stroke in providing compressed air to an airlift pump positioned below the water level under the ground.

In fulfillment of these and other objectives, the present invention provides a system for pumping water from a well drilled into an underground water source that is operable in association with the windmill having a tower frame, a wind driven turbine, and a reciprocating pump shaft operably connected to the turbine. The system includes an air pump mechanically linked to the reciprocating pump shaft of the windmill and operable by the direct reciprocating motion of the shaft. The air pump is positioned within the windmill tower frame in line with the shaft and is held stationary with respect to the ground. The air pump operates through the reciprocating motion of the windmill shaft and delivers a flow of compressed air from an outlet port. An air conduit is connected to the outlet port and is directed into the well down to a point below the water level within the well. An air lift fluid pump is positioned within the well and comprises a fluid conduit with a first end positioned below the ground within the water table for receiving a flow of water there from, and a second end that extends above the ground for delivering a flow of water thereto. The air lift fluid pump comprises a submerged mixing chamber wherein compressed air received from the air conduit from the surface is injected into the mixing chamber forming a buoyant air-water mixture. This buoyant mixture flows towards the surface which in turn draws water up through the fluid conduit to the surface.

Other objectives will become apparent to those skilled in the art from a reading of the following description and consideration of the appended drawings.

DESCRIPTION OF THE PREFERRED EMBODIMENTS

Figure 1:
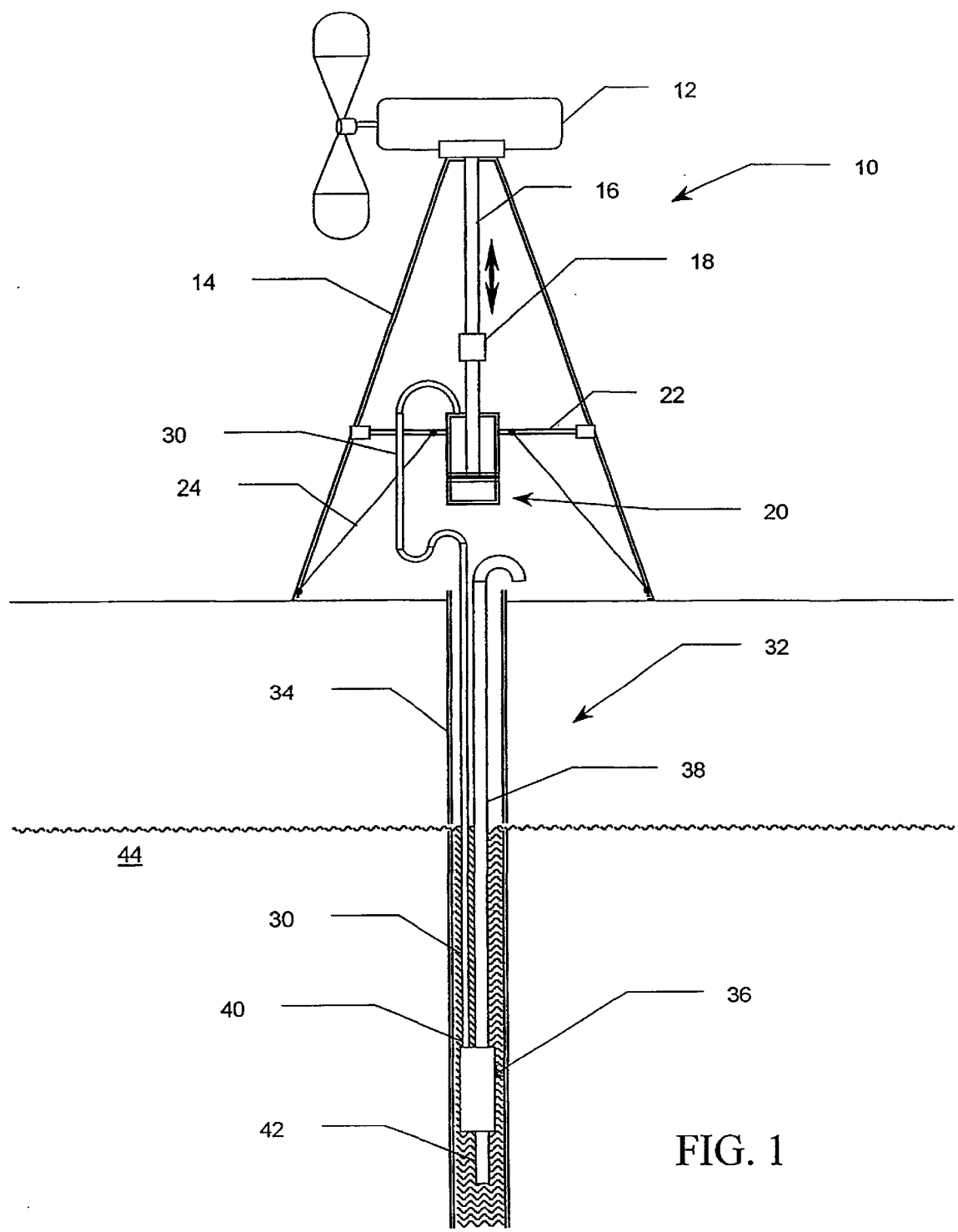
FIG. 1 is a partial cross-sectional view of the entire assembly of the present invention shown installed on a typical windmill structure.

Reference is made first to FIG. 1 for a detailed description of the overall system of the present invention. The invention is intended to be utilized in conjunction with either an existing windmill system or to be installed in conjunction with a newly operable windmill system of the type typically employed in remote locations. The present invention is utilized in conjunction with windmill 10 that typically incorporates wind turbine 12 positioned at the apex of a tower frame 14 constructed on the ground. Windmill 10 incorporates a reciprocating shaft 16 that is attached to wind turbine 12 and moves in a direct reciprocating motion up and down with respect to the ground surface. Reciprocating shaft 16 typically terminates at an in-line linkage 18 that in the prior art is attachable to a down shaft that extends into the well 32. In the present invention, in-line linkage 18 is attached instead to air pump 20 as shown. Air pump 20 is positioned within tower frame 14 and is held in a relatively fixed configuration by pump supports 22 and 24. It is anticipated that lateral pump supports 22 will fix air pump 20 in a position immediately below reciprocating shaft 16 while vertical pump supports 24 will maintain air pump 20 in a fixed vertical position despite the reciprocating motion of reciprocating shaft 16. Air pump 20 delivers a flow of air by means of the motion of piston rod 26 (see FIG. 2) and piston plunger 28 within the air pump cylinder. This air flow moves from air pump 20 through air conduit 30 down into well 32 as described in more detail below.

Well 32 is typically constructed utilizing well casing 34 that extends into an underground water source 44. Fluid conduit 38 extends into well 32 to a point below the water level of underground water source 44. Air conduit 30 extends from air pump 20 above the surface to air lift fluid pump 36 below the surface. The operation of air lift fluid pump 36 is described in more detail below. In general, however, an air injection port 40 provides a flow of air into fluid conduit 38 which results in the lifting of water within fluid conduit 38 up to the surface. At the same time, water enters fluid conduit 38 at a first end 42 thereof positioned within underground water source 44.

Figure 2:
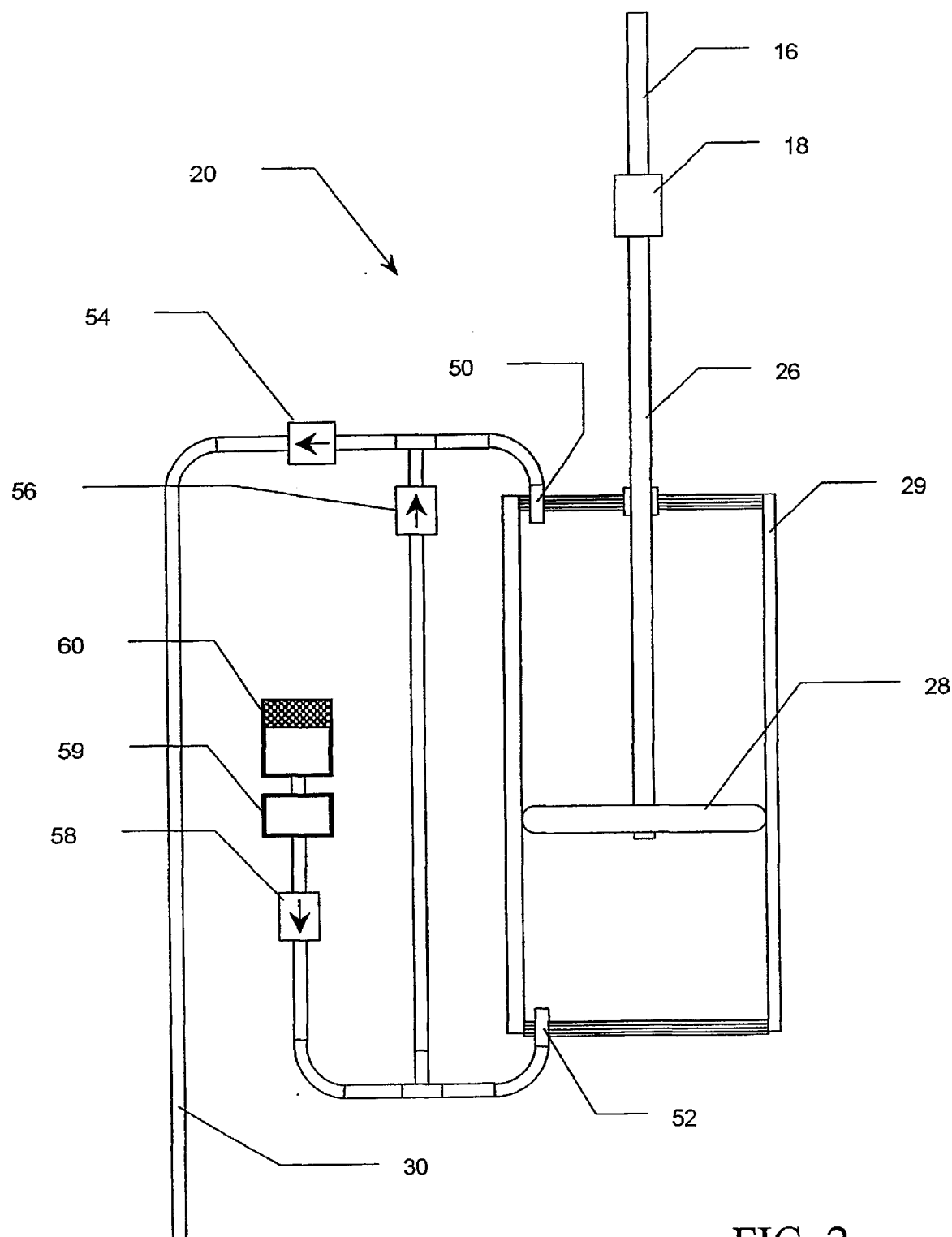
FIG. 2 is a detailed view of the air pump associated with the system of the present invention.

Reference is now made to FIG. 2 for a detailed description of the structure and operation of air pump 20 positioned as indicated in FIG. 1. Air pump 20 is linked to the reciprocating motion of the windmill by means of reciprocating shaft 16 connected through in-line linkage 18 to piston rod 26. Piston rod 26 is attached as typical to piston plunger 28 which is free to move up and down within air pump cylinder 29. Any of a number of inexpensive air pumping systems configured as shown are available in the industry.

In order to take advantage of the upstroke/power stroke of the typical windmill system, air pump 20 of the present invention is fitted with a number of air conduit sections and check valves designed to direct a flow of compressed air down air conduit 30 into the water well. Air pump 20 incorporates upper air outlet port 50 and lower air outlet port 52. During an up stroke, air is drawn through air filter 60 and through check valve 58 into the lower chamber of air pump cylinder 29. During the upstroke, air in the upper chamber of air pump cylinder 29 is compressed until it exceeds the air pressure within the air conduit 30 extending into the well. Once this pressure is exceeded, check valve 54 opens and compressed air is allowed to flow into the well as described in more detail below. In this manner, utilization of the power stroke of the typical reciprocating shaft windmill is utilized while the return stroke (the downward stroke) is used to simply refresh the air within air pump 20. During the down stroke air is expelled from the lower chamber of air pump cylinder 29 and is directed into the upper chamber thereof through check valve 56.

Positioned in association with air filter 60 is pneumatic oiler 59. This device, well known in the art, facilitates the operation of the air pump by allowing a small amount of lubricant to flow into the pump with the air. Under conditions where potable water is required the lubricating oil should be a food grade oil or the equivalent.

Figure 3:
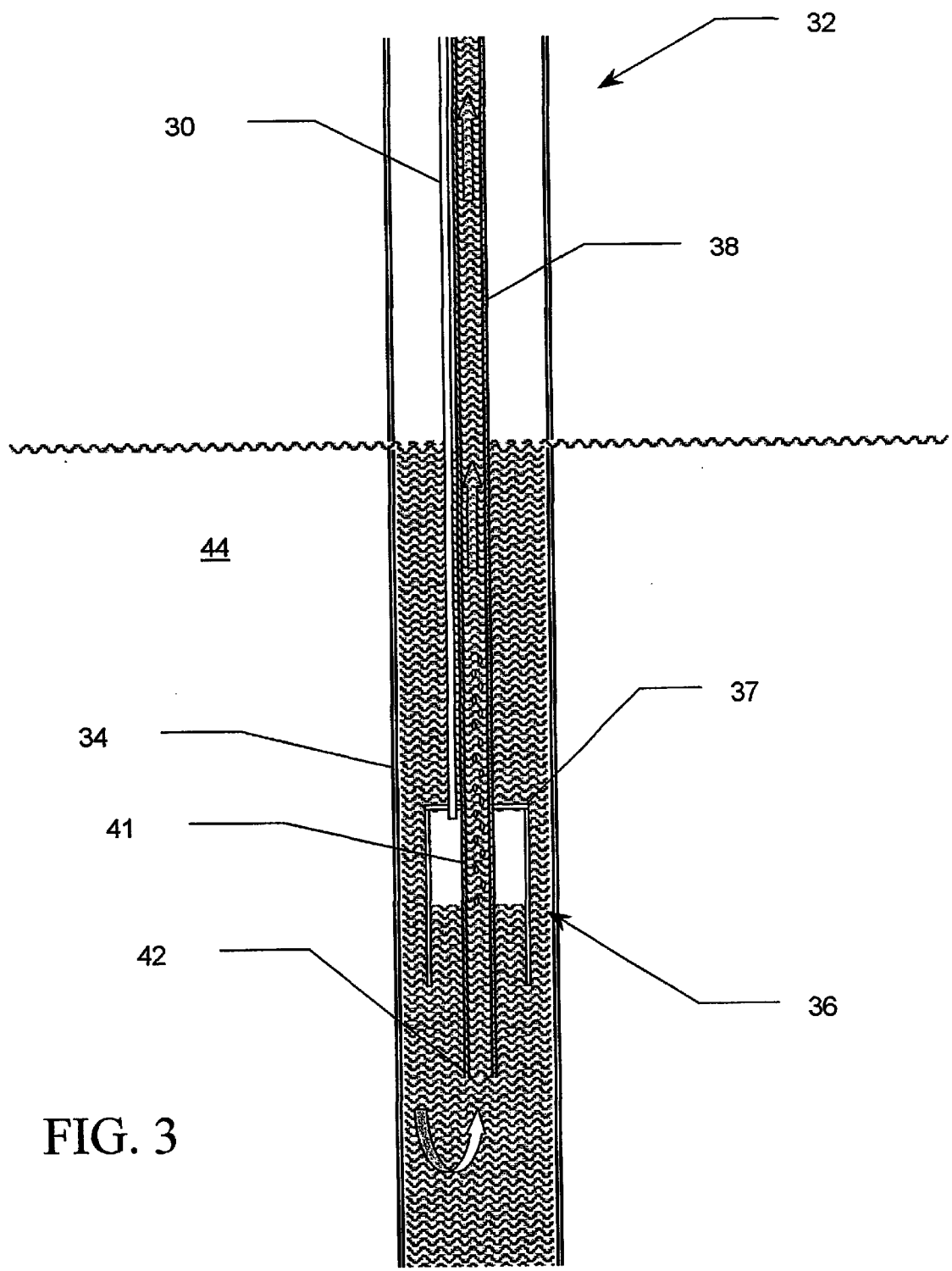
FIG. 3 is a detailed view of a first preferred embodiment of the air lift fluid pump associated with the system of the present invention.

Reference is now made to FIG. 3 for a detailed description of the structure and function of a first embodiment of air lift fluid pump 36. Water well 32 is drilled through the ground into the area of an underground water source 44. Typically, well 32 incorporates well casing 34 to prevent breakdown of the walls in the well. Positioned below the water level of underground water source 44 is a first inlet end 42 of fluid conduit 38. Positioned apart and vertically higher than first end 42 of fluid conduit 38 is air lift fluid pump 36. In the generic preferred embodiment air lift fluid pump 36 comprises an air injection port 40 (as in FIG. 1) that delivers compressed air received by way of air conduit 30 into fluid conduit 38. In the first preferred embodiment shown in FIG. 3, air lift fluid pump 36 comprises a concentric, cylindrical bell enclosure 37 that surrounds a section of fluid conduit 38 as shown. The section of fluid conduit 38 within the confines of cylindrical enclosure 37 is perforated by a plurality of holes 41 that constitute the air injection port 40. In this manner, air pumped through air conduit 30 into air lift fluid pump 36 is directed by pressures within cylindrical enclosure 37 through holes 41 of air injection port 40 into fluid conduit 38 and therein mixes with the water contained in fluid conduit 38. The water-air mixture within fluid conduit 38 is buoyant, and therefore rises to the surface under the force of the hydrostatic pressure of the surrounding water entering through the first end 42 of fluid conduit 38. In this manner, a flow of water is created from the first end 42 through fluid conduit 38 to the surface where it may be stored in a reservoir or utilized as needed.

Figure 4:
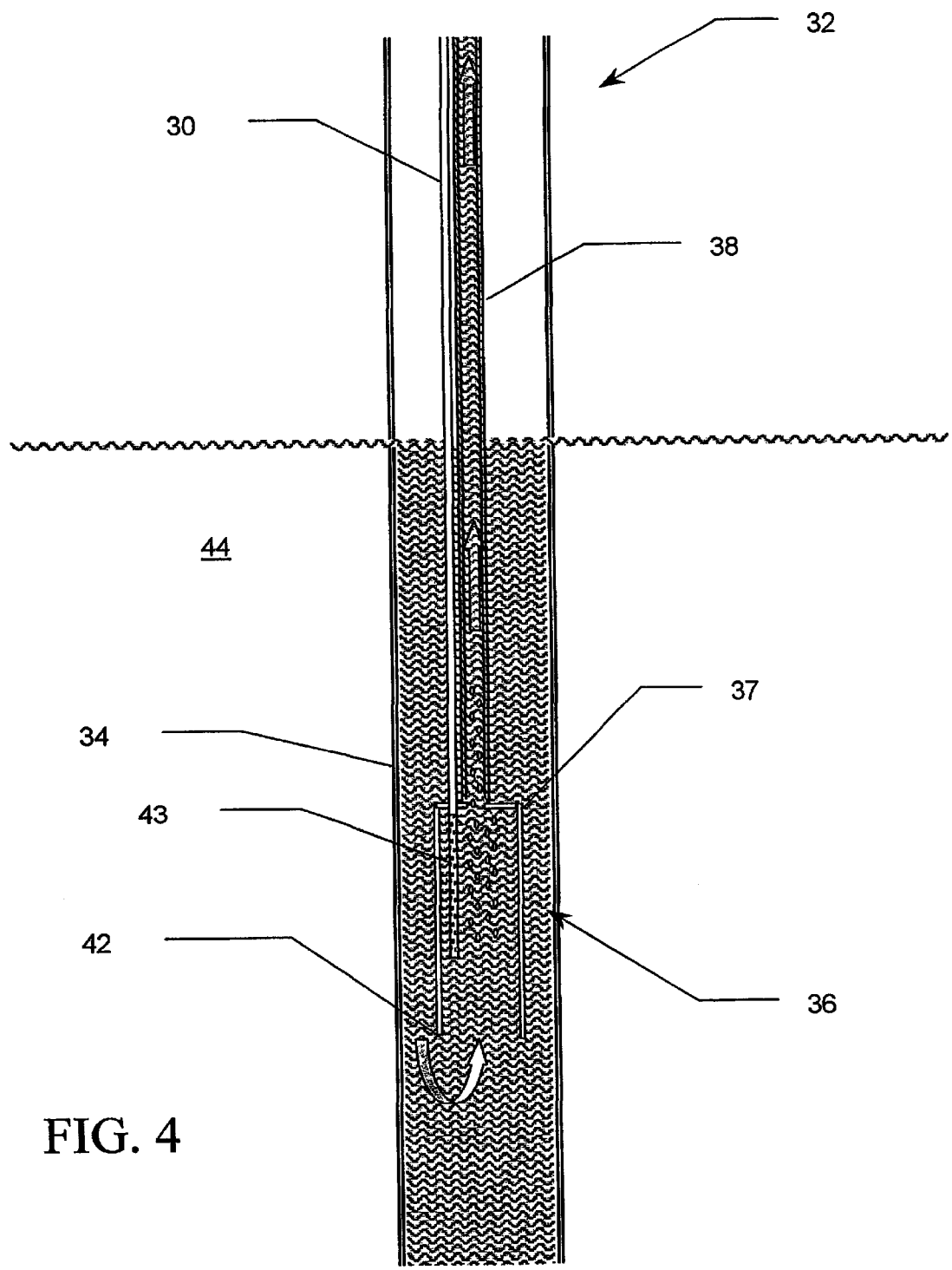
FIG. 4 is a detailed view of a second preferred embodiment of the air lift fluid pump associated with the system of the present invention.

FIG. 4 shows an alternate preferred embodiment for air lift fluid pump 36. In this embodiment first open end 42 of fluid conduit 38 comprises the open end of cylindrical bell enclosure 37 as shown. Air conduit 30 in this embodiment extends into cylindrical enclosure 37 and is perforated by a plurality of holes 43 that constitute the air injection port 40 (of FIG. 1). In this embodiment the air mixes with the water within enclosure 37 and flows upward into fluid conduit 38 in the same manner as described above with respect to the first embodiment of air lift fluid pump 36.

The combination of the air pump and air lift fluid injection pump of the present invention works with greatest efficiency when it is submerged to a point where approximately 60% of the total length of fluid conduit 38 is submerged underwater. A certain water pressure exists at the preferred depth of the air injection pump and it is this pressure that the compressed air must overcome in order to create bubbles in the mixing chamber. The air pump arranged as described above to compress air and deliver it into the well is sized such that the pulling force available from the power stroke of the pump rod of the typical windmill is enough to overcome the force on the air cylinder at the air pressure required for an air injection pump at the depths encountered. The present invention has been shown to be operable in a well where the water is approximately 100 feet below the surface. The air injection pump, under such conditions, is submerged at 150 feet below the water level where the water pressure is approximately 65 pounds per square inch. It has been determined that an existing windmill structure with a 12-foot diameter turbine is capable of approximately 765 pounds of pulling force. A four inch bore cylinder for the air pump as described may therefore be driven by such a windmill when the cylinder is under 65 psi of pressure. The water pumping apparatus constructed in this manner is capable of producing between two to three gallons per minute of water under 15 mph wind speed conditions.

Although the present invention has been described in conjunction with a specific preferred embodiment, it is anticipated that those skilled in the art will identify further embodiments and modifications that fall within the spirit and scope of the invention. Other types of air compression/air pump mechanisms may be utilized in place of the described air pump as an example. Similarly, alternative air lift fluid pumps may be utilized in conjunction with the system of the present invention without departing from its scope. The range and scope of the present invention is more completely described in the appended claims.

We claim:

1. A system for pumping water from a well drilled into an underground water source, said system operable in association with a wind mill, said wind mill having a tower frame, a wind driven turbine positioned at an apex of said tower frame, and a reciprocating pump shaft operably connected to said turbine and positioned between said turbine and the ground, the system comprising:

an air pump mechanically linked to said reciprocating pump shaft and operable by the direct reciprocating motion of said shaft, said air pump positioned within said tower frame and having an air outlet port;

an air conduit connected to said air outlet port of said air pump and directed into said well; and an air-lift fluid pump positioned within said well and said underground water source, said air-lift fluid pump comprising a fluid conduit having a first end positioned below the ground, open to said underground water source for receiving a flow of water there from, and a second end extending above the ground for delivering a flow of water thereto, said air-lift fluid pump further comprising an air injection port positioned proximate to said first end of said fluid conduit, said air injection port connected to said air conduit for delivering a flow of air into said fluid conduit;

wherein air from said air conduit mixes with water from said underground water source at a point within said fluid conduit near said first end thereof, thereby causing a buoyant water and air mixture to flow from said first end of said fluid conduit towards said second end thereof.

2. The system of claim 1 wherein said air injection port is positioned within said fluid conduit and comprises a plurality of holes in the walls of a terminal length of said air conduit extending into said fluid conduit.

3. The system of claim 1 wherein said air injection port is positioned outside of said fluid conduit and comprises a bell surrounding a length of said fluid conduit for receiving said flow of air from said air conduit and a plurality of holes in the walls of said length of said fluid conduit surrounded by said bell.

4. The system of claim 1 wherein said air pump comprises a movable piston within a cylinder, said piston having a piston shaft linked to said reciprocating pump shaft of said wind mill, said cylinder of said air pump aligned with the motion of said reciprocating pump shaft.

5. The system of claim 4 wherein said cylinder of said air pump comprises upper and lower chambers separated by said piston and said air outlet port of said air pump is positioned on said upper chamber such that air flow through said air outlet port occurs on an up-stroke of said reciprocating pump shaft of said wind mill.

6. The system of claim 1 further comprising a horizontal stabilizer for maintaining said air pump in a fixed position within said tower frame inline with said reciprocating shaft.

7. The system of claim 1 further comprising a vertical stabilizer for maintaining said air pump in a fixed position within said tower frame with respect to the motion of said reciprocating shaft and with respect to the ground.

8. A system for pumping water from a well drilled into an underground water source, said system operable in association with a wind mill, said wind mill having a tower frame, a wind driven turbine positioned at an apex of said tower frame, and a reciprocating pump shaft operably connected to said turbine and positioned between said turbine and the ground, the system comprising:

an air pump mechanically linked to said reciprocating pump shaft and operable by the direct reciprocating motion of said shaft, said air pump fixed in a stabilized position within said tower frame, said air pump further comprising an air outlet port and a movable piston within a cylinder, said piston having a piston shaft linked to said reciprocating pump shaft of said wind mill, said cylinder of said air pump aligned with the motion of said reciprocating pump shaft;

an air conduit connected to said air outlet port of said air pump and directed into said well; and an air-lift fluid pump positioned within said well and said underground water source, said air-lift fluid pump comprising a fluid conduit having a first end positioned below the ground, open to said underground water source for receiving a flow of water there from, and a second end extending above the ground for delivering a flow of water thereto, said air-lift fluid pump further comprising an air injection port positioned within said first end of said fluid conduit, said air injection port comprising a plurality of holes in the walls of a terminal length of said air conduit extending into said fluid conduit;

wherein air from said air conduit mixes with water from said underground water source at a point within said fluid conduit near said first end thereof, thereby causing a buoyant water and air mixture to flow from said first end of said fluid conduit towards said second end thereof.

9. A method for retrofitting an improved pumping system on to an existing wind mill operated water well pumping system, said wind mill having a tower frame, a wind driven turbine positioned at an apex of said tower frame, a reciprocating pump shaft operably connecting said turbine with a down hole reciprocating fluid pump, and a water delivery tube, said method comprising the steps of:

disconnecting said reciprocating pump shaft from said down hole reciprocating fluid pump and establishing a lower end of said reciprocating pump shaft at a point above the ground;

removing said down hole reciprocating fluid pump from said water well;

positioning an air pump within said tower frame inline and mechanically connected to said reciprocating shaft, said air pump having an air outlet port;

positioning an air conduit between said air outlet port of said air pump and a point within said well proximate to an intake end of said water delivery tube; and positioning an air-lift fluid pump within said well at said intake end of said water delivery tube, said air-lift fluid pump comprising a fluid conduit having a first end open to an underground water source for receiving a flow of water there from, and a second end in flow communication with said water delivery tube, said air-lift fluid pump further comprising an air injection port positioned proximate to said first end of said fluid conduit, said air injection port connected to said air conduit for delivering a flow of air into said fluid conduit;

wherein air from said air conduit mixes with water from said underground water source at a point within said fluid conduit near said first end thereof, thereby causing a buoyant water and air mixture to flow from said first end of said fluid conduit into and through said water delivery tube out of the water well.

10. The method of claim 9 wherein said step of positioning said air pump within said tower frame comprises the steps of:

fixing horizontal stabilizes between said air pump and said tower frame; and fixing vertical stabilizers between said air pump and said tower frame;

wherein said air pump remains horizontally positioned approximately beneath said lower end of said reciprocating pump shaft and vertically positioned at a fixed distance above the ground so as to resist an upward motion of said reciprocating shaft.

* * * * *